US010081321B2

United States Patent
Fabiano et al.

(10) Patent No.: US 10,081,321 B2
(45) Date of Patent: Sep. 25, 2018

(54) BUMPER ASSEMBLIES AND VEHICLES COMPRISING SAME

(71) Applicant: MORGAN OLSON CORPORATION, Sturgis, MI (US)

(72) Inventors: Frank Anthony Fabiano, Bronson, MI (US); Nathan Garrett Ernst, Dexter, MI (US)

(73) Assignee: MORGAN OLSON CORPORATION, Sturgis, MI (US)

( * ) Notice: Subject to any disclaimer, the term of this patent is extended or adjusted under 35 U.S.C. 154(b) by 0 days.

(21) Appl. No.: 15/399,906

(22) Filed: Jan. 6, 2017

(65) Prior Publication Data

US 2017/0197572 A1    Jul. 13, 2017

Related U.S. Application Data

(60) Provisional application No. 62/275,947, filed on Jan. 7, 2016.

(51) Int. Cl.
| | |
|---|---|
| *B60R 19/14* | (2006.01) |
| *B60R 19/46* | (2006.01) |
| *B60R 19/02* | (2006.01) |
| *B60R 19/04* | (2006.01) |

(52) U.S. Cl.
CPC ............ *B60R 19/46* (2013.01); *B60R 19/023* (2013.01); *B60R 19/04* (2013.01); *B60R 19/14* (2013.01)

(58) Field of Classification Search
CPC ......... B60R 19/44; B60R 19/46; B60R 19/28; B60R 19/285; B60R 19/14; B60R 19/16; B60R 19/04

USPC .................................................. 293/149–155
See application file for complete search history.

(56) References Cited

U.S. PATENT DOCUMENTS

| | | | |
|---|---|---|---|
| 996,207 A | 6/1911 | Brown et al. | |
| 1,224,817 A | 5/1917 | Westover | |
| 1,247,569 A | 11/1917 | Palmer | |
| 1,305,292 A | 6/1919 | Long | |
| 1,315,676 A | 9/1919 | Luttinger | |
| 1,332,142 A | 2/1920 | Olsen | |
| 1,351,837 A | 9/1920 | Louis | |
| 1,375,244 A | 4/1921 | Whitney | |
| 1,589,549 A | 6/1926 | John | |
| 1,686,829 A * | 10/1928 | Malling | B60R 19/14 293/150 |
| 1,705,119 A | 3/1929 | Jacobs | |
| 1,792,157 A * | 2/1931 | Franke | B60R 19/26 293/13 |
| 1,802,925 A * | 4/1931 | Olsen | B60R 19/02 293/146 |

(Continued)

*Primary Examiner* — Hilary L Gutman
(74) *Attorney, Agent, or Firm* — Ballard Spahr LLP (57) ABSTRACT

A bumper assembly having a transverse bumper body and at least one wing extension that is configured for pivotal movement relative to a side end of the transverse bumper body. Each wing extension has inner and outer surfaces and is moveable from a rest position to an impact position in response to an impact force acting within a horizontal plane. In the rest position, the outer surface of each wing extension is parallel or substantially parallel to the transverse axis, and in the impact position, the outer surface of the wing extension is positioned at an acute angle relative to the transverse axis. Each wing extension is configured to return to its rest position in response to removal of the impact force.

15 Claims, 6 Drawing Sheets

(56) References Cited

U.S. PATENT DOCUMENTS

| | | | | |
|---|---|---|---|---|
| 1,813,517 A * | 7/1931 | Thomas | B60R 19/285 | 293/135 |
| 1,814,421 A * | 7/1931 | Veale | B60R 19/26 | 293/146 |
| 1,844,216 A * | 2/1932 | Erickson | B60R 19/14 | 293/150 |
| 1,865,801 A | 7/1932 | Tarte | | |
| 1,898,256 A * | 2/1933 | Monteith | B60R 19/18 | 293/146 |
| 1,915,231 A * | 6/1933 | Johnson | B60R 19/02 | 180/275 |
| 2,196,561 A * | 4/1940 | Lester | B60R 19/04 | 293/114 |
| 2,222,404 A * | 11/1940 | Cookenboo | B60R 19/14 | 293/150 |
| 2,597,058 A * | 5/1952 | Bircsak | B60R 19/14 | 293/150 |
| 2,667,374 A * | 1/1954 | Signori | B60R 19/14 | 293/150 |
| 2,672,363 A * | 3/1954 | Buchanan | B60R 19/14 | 293/118 |
| 2,731,289 A * | 1/1956 | Corydon, II | B60R 19/20 | 293/108 |
| 2,758,866 A * | 8/1956 | Dollar | B60R 19/44 | 293/143 |
| 2,954,256 A * | 9/1960 | Barenyi | B60R 19/04 | 293/136 |
| 3,596,963 A * | 8/1971 | Phillips | B60R 19/04 | 293/150 |
| 3,834,686 A | 9/1974 | Moritz et al. | | |
| 3,843,180 A * | 10/1974 | Alexander | B60R 19/14 | 293/150 |
| 3,884,517 A * | 5/1975 | Davidson | B60R 19/04 | 293/149 |
| 3,907,352 A * | 9/1975 | Spain | B60R 19/04 | 293/149 |
| 3,924,888 A * | 12/1975 | Butcher | B60R 19/14 | 293/149 |
| 4,130,312 A * | 12/1978 | Cooper, Sr. | B60R 19/04 | 293/153 |
| 4,266,818 A * | 5/1981 | Hightower | B60R 19/14 | 188/371 |
| 4,829,979 A | 5/1989 | Moir | | |
| 5,000,499 A * | 3/1991 | Shephard | B60R 19/14 | 188/376 |
| 6,767,039 B2 * | 7/2004 | Bird | B60R 19/04 | 293/150 |
| 7,063,364 B2 | 6/2006 | Bird et al. | | |
| 7,478,849 B2 | 1/2009 | Fortin | | |
| 2006/0066116 A1* | 3/2006 | Straughn | B60R 19/285 | 293/135 |

* cited by examiner

BUMPER ASSEMBLIES AND VEHICLES COMPRISING SAME

CROSS-REFERENCE TO RELATED APPLICATION

This application claims priority to and the benefit of the filing date of U.S. Provisional Patent Application No. 62/275,947, filed on Jan. 7, 2016, which is hereby incorporated herein by reference in its entirety.

FIELD

The disclosed invention relates to bumper assemblies for use on vehicles, including, for example and without limitation, delivery vehicles and recreational vehicles.

BACKGROUND

Conventional vehicle bumpers often must be replaced or repaired following low-speed impacts. The use of such bumpers, which must be repaired or replaced in response to collisions, can greatly increase the cost of vehicle ownership, particularly for vehicles that frequently experience low-speed impacts. Moreover, when vehicle bumpers are not replaced following a collision, the vehicle bumpers are often not as effective as they were in their original condition. In particular, vehicle bumpers are often damaged at the ends or corner portions of the bumpers.

Thus, there is a need for vehicle bumpers that can maintain functionality following low-speed impacts. There is a further need for vehicle bumpers that can withstand low-speed impacts and be re-used without maintenance or repair.

SUMMARY

Described herein, in various aspects, is a bumper assembly having a transverse bumper body and a first wing extension. The transverse bumper body can have opposed first and second side ends spaced apart relative to a transverse axis. The first wing extension can be pivotally coupled to the bumper assembly and be configured for pivotal movement relative to the first side end of the transverse bumper body. The first wing extension can have inner and outer surfaces and be moveable from a rest position to an impact position in response to an impact force acting within a horizontal plane. In the rest position, the outer surface of the first wing extension can be parallel or substantially parallel to the transverse axis. In the impact position, the outer surface of the first wing extension can be positioned at an acute angle relative to the transverse axis. The first wing extension can be configured to return to the rest position in response to removal of the impact force.

Also described is a bumper assembly having a transverse bumper body and first and second wing extensions. The transverse bumper body can have opposed first and second side ends spaced apart relative to a transverse axis. The first and second wing extensions can be pivotally coupled to the bumper assembly and be configured for pivotal movement relative to the first and second side ends of the transverse bumper body. The first and second wing extensions can have inner and outer surfaces and be moveable from a rest position to an impact position in response to an impact force acting within a horizontal plane. In the rest position, the outer surfaces of the first and second wing extensions can be parallel or substantially parallel to the transverse axis. In the impact position, the outer surfaces of the first and second wing extensions can be positioned at an acute angle relative to the transverse axis. The first and second wing extensions can be configured to return to the rest position in response to removal of the impact force.

Further described herein is a vehicle having a vehicle body and at least one bumper assembly coupled to the vehicle body. Each bumper assembly can comprise a transverse bumper body having opposed first and second side ends spaced apart relative to a transverse axis. The first and second wing extensions can be pivotally coupled to the bumper assembly and be configured for pivotal movement relative to the first and second side ends of the transverse bumper body. The first and second wing extensions can have inner and outer surfaces and be moveable from a rest position to an impact position in response to an impact force acting within a horizontal plane. In the rest position, the outer surfaces of the first and second wing extensions can be parallel or substantially parallel to the transverse axis. In the impact position, the outer surfaces of the first and second wing extensions can be positioned at an acute angle relative to the transverse axis. The first and second wing extensions can be configured to return to the rest position in response to removal of the impact force.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a", "an", and "the" include plural referents unless the context clearly dictates otherwise. For example, use of the term "a mounting bracket" can refer to one or more of such mounting brackets.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

As used herein, the term "elastic" refers to a material that is capable of at least partially recovering its size and shape following deformation.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

Disclosed herein, in various aspects and with reference to FIGS. 1A-3B, is a bumper assembly 10. In exemplary aspects, the bumper assembly 10 can be provided as a component of a vehicle 100, such as, for example and without limitation, a delivery vehicle (e.g, a walk-in van or truck), a passenger vehicle, a recreational vehicle, a car, a truck, a golf cart, and the like. In these aspects, the bumper assembly 10 can be coupled to a vehicle body 105 such that the bumper assembly extends outwardly from the vehicle body and shields the vehicle body from impact forces (Fi) applied toward the vehicle body. In some aspects, the bumper assembly 10 can be provided as a front bumper. In other aspects, the bumper assembly 10 can be provided as a rear bumper. In still other aspects, a first bumper assembly can be provided as a front bumper and a second bumper assembly can be provided as a rear bumper. Optionally, in still other aspects, it is contemplated that the bumper assembly 10 can be provided as a side bumper, either alone or in combination with a front or rear bumper assembly as disclosed herein.

The Bumper Assembly

In exemplary aspects, and with reference to FIGS. 1A-3A, the bumper assembly 10 can comprise a transverse bumper body 20 and at least a first wing extension 30a. In one aspect, the transverse bumper body 20 can have opposed first and second side ends 22, 24 spaced apart relative to a transverse axis 12. In another aspect, the first wing extension 30a can be pivotally coupled to the bumper assembly 10 at a pivot point 35a such that the first wing extension is configured for pivotal movement relative to the first side end 22 of the transverse bumper body 20. Optionally, in this aspect, the first wing extension 30a can be pivotally coupled (e.g., pivotally secured or mounted) to the transverse bumper body 20 at pivot point 35a. It is further contemplated that the first wing extension 30a can be pivotally coupled to the transverse bumper body 20 using a fulcrum or pin as are known in the art. In a further aspect, and with reference to FIGS. 2A-2B, the first wing extension 30a can have inner and outer surfaces 32a, 34a and be moveable from a rest position to an impact position in response to an impact force (Fi) acting within a horizontal plane 200. In the rest position, as shown in FIG. 2A, the outer surface 34a of the first wing extension 30a can be parallel or substantially parallel to the transverse axis 12. In the impact position, as shown in FIG. 2B, the outer surface 34a of the first wing extension 30a can be positioned at an acute angle 36 relative to the transverse axis 12. More generally, in the impact position, the angular orientation of the outer surface 34a of the first wing extension 30a relative to the transverse axis 12 is different than the angular orientation of the outer surface of the first wing extension in the rest position. Typically, in the impact position, the first wing extension is more displaced (inwardly) than in the rest position. In exemplary aspects, acute angle 36 can range from about 1 degree to about 89 degrees, from about 2 degrees to about 60 degrees, from about 3 degrees to about 45 degrees, or from about 5 degrees to about 20 degrees. However, it is contemplated that any change in angular orientation relative to the rest position can occur, provided it does not exceed the maximum angular deflection permitted by the stop elements further disclosed herein. In use, the first wing extension 30a can be configured to return to the rest position in response to removal of the impact force (Fi).

In exemplary aspects, the bumper assembly 10 can further comprise a first elastic plate 40a coupled to the transverse bumper body 20 and extending laterally outwardly (relative to the transverse axis 12) from the first side end 22 of the transverse bumper body. In these aspects, the first elastic plate 40a can be positioned to contact the inner surface 32a of the first wing extension 30a as the first wing extension moves from the rest position to the impact position, thereby deforming the first elastic plate 40a. Optionally, it is contemplated that the inner surface 32a of the first wing extension 30a can define or comprise a pad or projecting portion 33a that is configured to contact the first elastic plate 40a and maintain a space between the first elastic plate and the outermost portions of the first wing extension. In use, following deformation, the first elastic plate 40a can be configured to apply a spring-back force to the first wing extension 30a to return the first wing extension to the rest position. In additional aspects, the first elastic plate 40a can have a proximal portion 42a that is rigidly coupled (e.g., rigidly secured or mounted) to the transverse bumper body 20 and a distal portion 44a that is deformable relative to the transverse axis to produce a spring-back (i.e., diving board) effect. Optionally, in these aspects, the proximal portion 42a of the first elastic plate 40a can be rigidly secured to the transverse bumper body 20 using at least one fastener 70 (e.g., at least one bolt or screw) that extends perpendicularly or substantially perpendicularly relative to the transverse axis 12 and passes through the transverse bumper body 20 and into the proximal portion 42a of the first elastic plate 40a. In exemplary aspects, it is contemplated that the characteristics and dimensions of the elastic plates disclosed herein can be selectively tailored to provide for desired levels of deformation and impact absorption.

In exemplary aspects, the bumper assembly 10 can further comprise a first stop element 50 configured to restrict deformation of the first elastic plate 40a beyond a first stop position. In these aspects, the first stop position can correspond to the maximum allowable pivotal movement of the first wing extension 30a. Thus, in use, the stop elements 50 disclosed herein can be positioned to prevent further movement of the wing extensions and prevent damage to the vehicle body.

In another aspect, the bumper assembly 10 can further comprise at least one mounting bracket 60 secured to the transverse bumper body 20. Optionally, in exemplary aspects and as shown in FIGS. 1A-3B, the first wing extension 30a can be pivotally coupled to the at least one mounting bracket 60 using a fulcrum or pin 82a as are known in the art. In these aspects, it is contemplated that the at least one mounting bracket 60 can be rigidly secured or mounted to the transverse bumper body 20, while the first wing extension 30a can be pivotally secured or mounted to the at least one mounting bracket 60. As shown in FIGS. 1A-3B, it is further contemplated that portions of the first wing extension 30a can overlap with or cover portions of an outer surface of the transverse bumper body 20.

In further aspects, it is contemplated that the at least one mounting bracket 60 can define the first stop element 50. Optionally, in further exemplary aspects, the at least one mounting bracket 60 can have a first end portion 64a that defines a first slot 62a configured to receive a portion of the first elastic plate 40a. In these aspects, as one of skill in the art will appreciate, the first slot 62a can cooperate with an inner surface of the transverse bumper body 20 to circumferentially enclose or substantially circumferentially enclose a portion of the first elastic plate 40a. It is further contemplated that inner or end surfaces of the first slot 62a can function as a stop element 50 that contacts portions of the elastic plate 40a to prevent further deformation of the plate and, consequently, restrict pivotal movement of the first wing extension 30a.

Figure 1A:
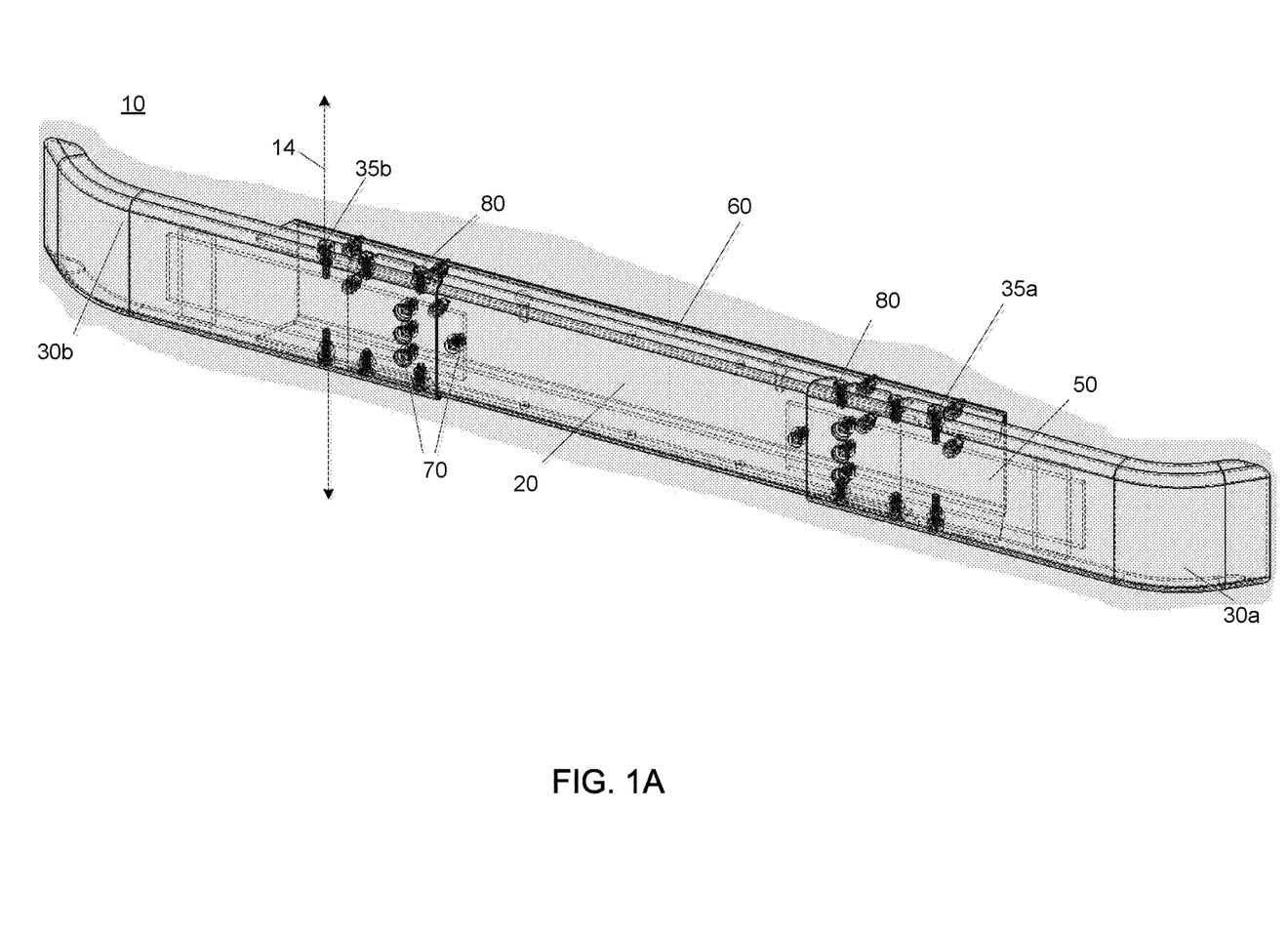
FIG. 1A is a partially transparent perspective view of an exemplary bumper assembly as disclosed herein.
Figure 1B:
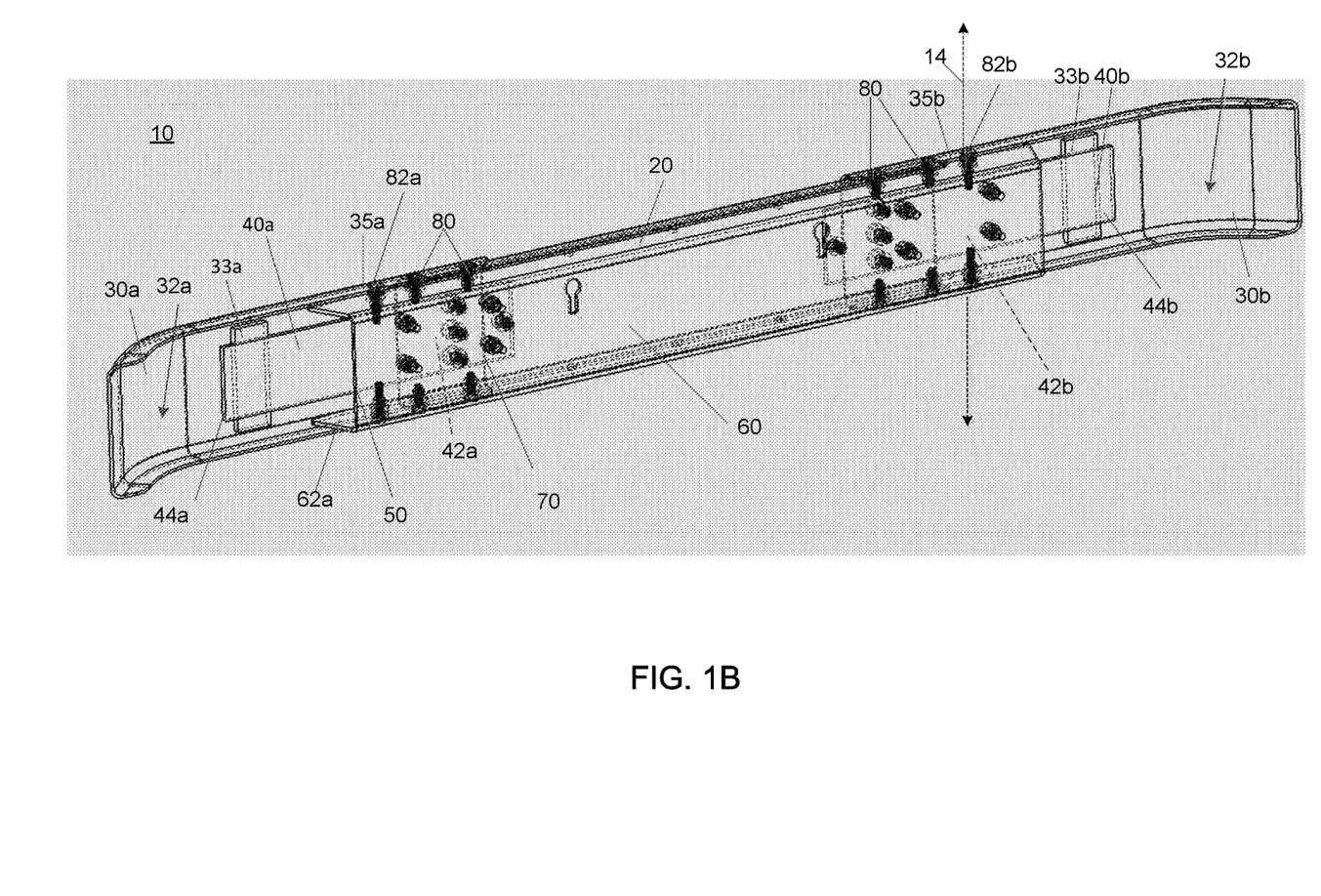
FIG. 1B is a partially transparent rear perspective view of the bumper assembly of FIG. 1A.
Figure 1C:
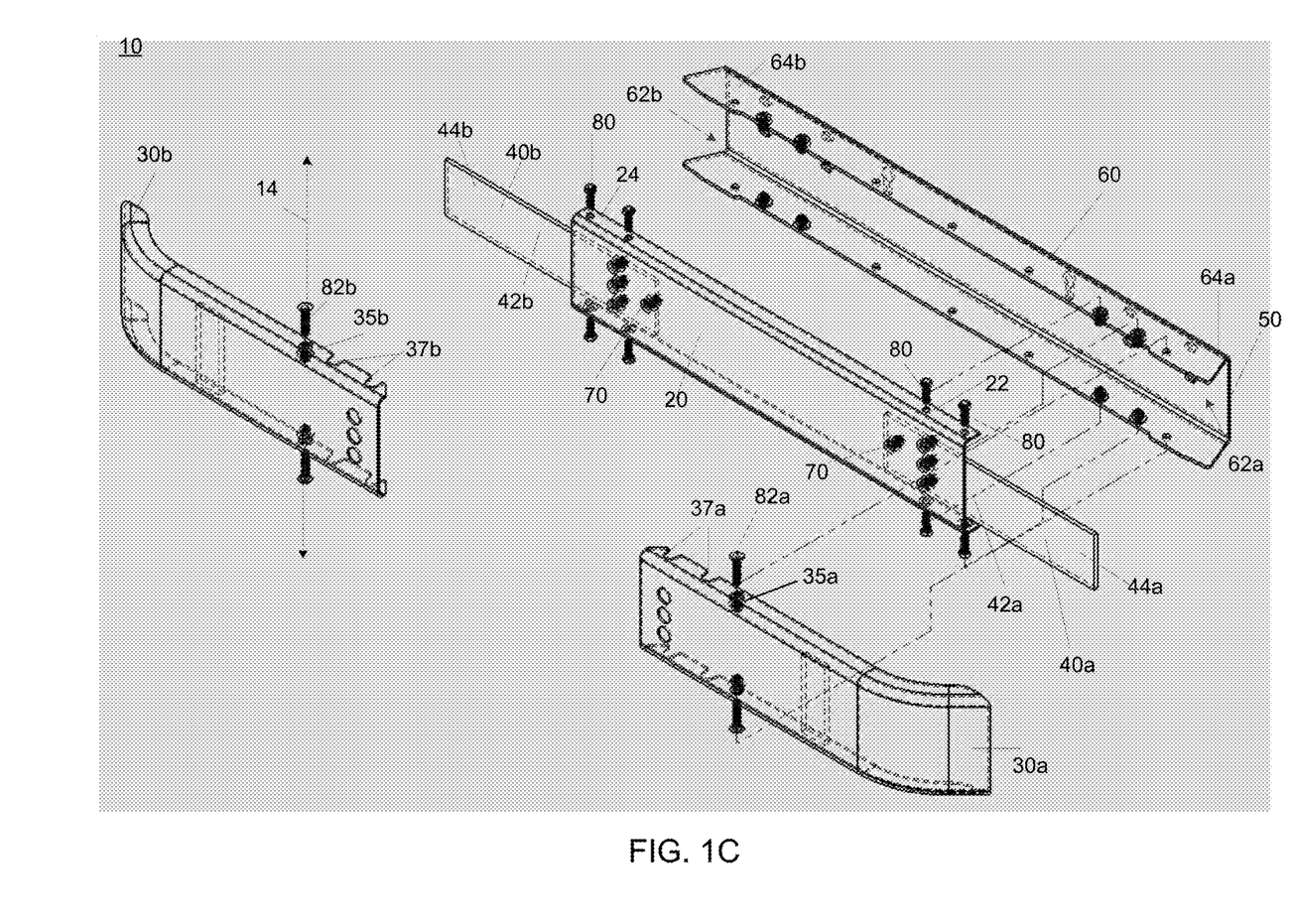
FIG. 1C is an exploded front perspective view of the bumper assembly of FIG. 1A.

In some aspects, the at least one mounting bracket 60 can comprise a single mounting bracket as shown in FIG. 1A-1C. Alternatively, in other aspects, the at least one mounting bracket 60 can comprise at least two mounting brackets, such as, for example, two mounting brackets that are spaced apart relative to the transverse axis 12 and configured for positioning at two opposed ends of a front side of a vehicle body. The at least one mounting bracket can be configured for secure connection to a vehicle using conventional fasteners and attachment mechanisms.

Optionally, in exemplary aspects, the bumper assembly 10 can further comprise a second wing extension 30b pivotally coupled to the bumper assembly 10 at a pivot point 35b such that the second wing extension is configured for pivotal movement relative to the second side end 24 of the transverse bumper body 20. Optionally, in these aspects, the second wing extension 30b can be pivotally coupled (e.g., pivotally secured or mounted) to the transverse bumper body 20 at pivot point 35b. It is further contemplated that the second wing extension 30b can be pivotally coupled to the transverse bumper body 20 using a fulcrum or pin as are known in the art. In these aspects, the second wing extension 30b can have inner and outer surfaces 32b, 34b and be moveable from a rest position to an impact position in response to an impact force (Fi) acting within the horizontal plane 200. In the same manner as the first wing extension 30a, in the rest position, the outer surface 34b of the second wing extension 30b can be parallel or substantially parallel to the transverse axis 12, and in the impact position, the outer surface 34b of the second wing extension can be positioned at an acute angle relative to the transverse axis 12. More generally, in the impact position, the angular orientation of the outer surface 34b of the second wing extension 30b relative to the transverse axis 12 is different than the angular orientation of the outer surface of the first wing extension in the rest position. Typically, in the impact position, the second wing extension is more displaced (inwardly) than in the rest position. In exemplary aspects, the acute angle of the outer surface of the second wing extension (in the impact position) can range from about 1 degree to about 89 degrees, from about 2 degrees to about 60 degrees, from about 3 degrees to about 45 degrees, or from about 5 degrees to about 20 degrees. However, it is contemplated that any change in angular orientation relative to the rest position can occur, provided it does not exceed the maximum angular deflection permitted by the stop elements further disclosed herein. In use, the second wing extension 30b can be configured to return to the rest position in response to removal of the impact force (Fi).

In exemplary aspects, when first and second wing extensions 30a, 30b are provided, the bumper assembly can comprise first and second elastic plates 40a, 40b coupled to the transverse bumper body 20 and extending laterally outwardly (relative to the transverse axis 12) from the respective first and second side ends 22, 24 of the transverse bumper body. In these aspects, the first and second elastic plates 40a, 40b can be positioned to contact the inner surfaces 32a, 32b of the first and second wing extensions 30a, 30b as the first and second wing extensions move from the rest position to the impact position, thereby deforming the first and second elastic plates 40a, 40b. Optionally, it is contemplated that the inner surfaces 32a, 32b of the first and second wing extensions 30a, 30b can define or comprise pads or projecting portions 33a, 33b that are configured to contact the first and second elastic plates 40a, 40b and maintain a space between the elastic plates and the outermost portions of the first and second wing extensions. In use, following deformation, the first and second elastic plates 40a, 40b can be configured to apply respective spring-back forces to the first and second wing extensions 30a, 30b to return the first and second wing extensions to the rest position. Optionally, in additional aspects, the first and second elastic plates 40a, 40b can have proximal portions 42a, 42b that are rigidly coupled (e.g., rigidly secured or mounted) to the transverse bumper body 20 and distal portions 44a, 44b that are deformable relative to the transverse axis 12 to produce a spring-back (i.e., diving board) effect. Optionally, in these aspects, the proximal portions 42a, 42b of the first and second elastic plates 40a, 40b can be rigidly secured to the transverse bumper body 20 using fasteners 70 (e.g., bolts or screws) that extend perpendicularly or substantially perpendicularly relative to the transverse axis 12 and respectively pass through the transverse bumper body 20 and into the proximal portions 42a, 42b of the first and second elastic plates 40a, 40b. Optionally, it is contemplated that the first and second wing extensions 30a, 30b can define openings that positioned in alignment with the fasteners 70 when the wing extensions are in the rest position, thereby permitting access to the fasteners.

In further aspects, when the bumper assembly 10 comprises first and second wing extensions 30a, 30b, the bumper assembly can further comprise first and second stop elements 50 configured to restrict deformation of the first and second elastic plates 40a, 40b beyond respective first and second stop positions. In these aspects, the first stop position can correspond to the maximum allowable pivotal movement of the first wing extension 30a, and the second stop position can correspond to the maximum allowable pivotal movement of the second wing extension 30b. In exemplary aspects, the at least one mounting bracket 60 can define the first and second stop elements 50. For example, in these aspects, the at least one mounting bracket 60 can have a first end portion 64a that defines a first slot 62a configured to receive a portion of the first elastic plate 40a and an opposed second end portion that defines a second slot 62b configured to receive a portion of the second elastic plate 40b. It is contemplated that inner or end surfaces of each slot 62a, 62b can function as stop elements 50 that contact portions of the elastic plates 40a, 40b to prevent further deformation of the plates and, consequently, restrict pivotal movement of the wing extensions.

Optionally, in exemplary aspects and as shown in FIGS. 1A-3B, the first and second wing extensions 30a, 30b can be pivotally coupled (e.g., pivotally secured or mounted) to the at least one mounting bracket 60 using fulcrums or pins 82a,82b as are known in the art. In these aspects, it is contemplated that the at least one mounting bracket 60 can be rigidly secured or mounted to the transverse bumper body 20, while the first and second wing extensions 30a, 30b can be pivotally secured or mounted to the at least one mounting bracket 60. As shown in FIGS. 1A-3B, it is further contemplated that portions of the first wing extensions 30a, 30b can overlap with or cover portions of an outer surface of the transverse bumper body 20.

In exemplary aspects, the first wing extension 30a can have a side surface 38a extending between the inner and outer surfaces 32a, 34a of the first wing extension. In these aspects, within the horizontal plane 200, the side surface 38a of the first wing extension 30a can be positioned at an acute angle relative to the outer surface 34a of the first wing extension (angled inwardly toward the vehicle body). Similarly, when the bumper assembly 10 comprises first and second wing extensions 30a, 30b, the first and second wing extensions can have respective side surfaces 38a, 38b extending between the inner and outer surfaces 32a, 32b, 34a, 34b of the respective first and second wing extensions. Within the horizontal plane 200, the side surfaces 38a, 38b of the first and second wing extensions 30a, 30b can be positioned at acute angles relative to the outer surfaces 34a, 34b of the respective first and second wing extensions (angled inwardly toward the vehicle body). Optionally, it is contemplated that the side surfaces 38a, 38b of the first and second wing extensions 30a, 30b can have a curved profile. In exemplary aspects, it is contemplated that the shapes and the dimensions of the side surfaces 38a, 38b can be selected to be complementary to the shape of adjacent portions of a vehicle body (e.g., a hood of the vehicle body) and to minimize the overall horizontal dimension of the bumper assembly.

Figure 2A:
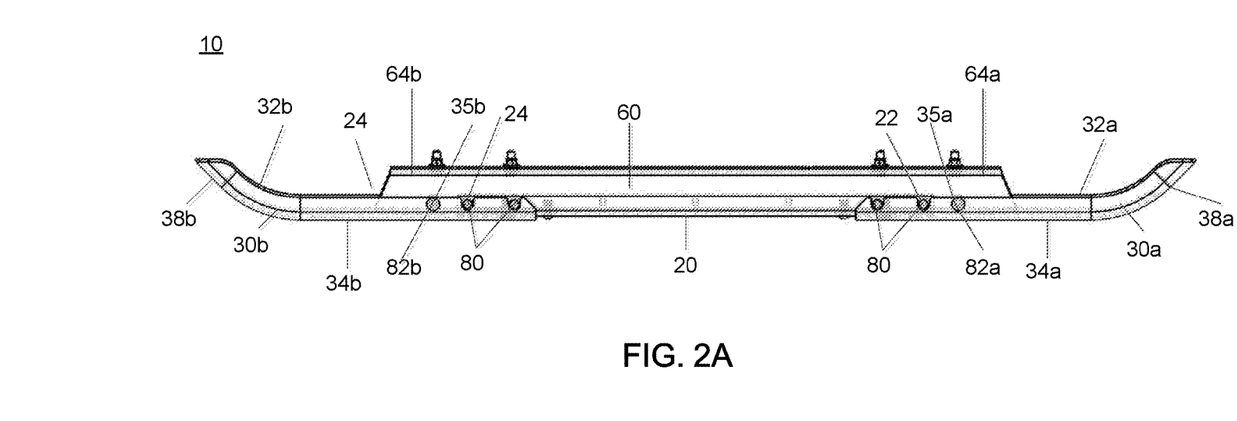
FIG. 2A is a top view of an exemplary bumper assembly as disclosed herein, showing a first wing extension of the bumper assembly in the rest position.
Figure 2B:
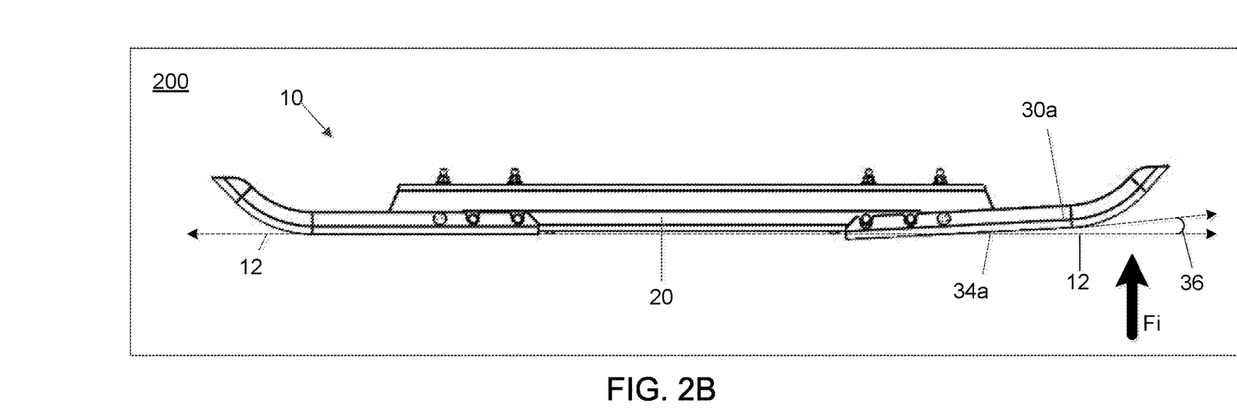
FIG. 2B is a top view of the bumper assembly of FIG. 2A, showing the first wing extension of the bumper assembly in the impact position.
Figure 3A:
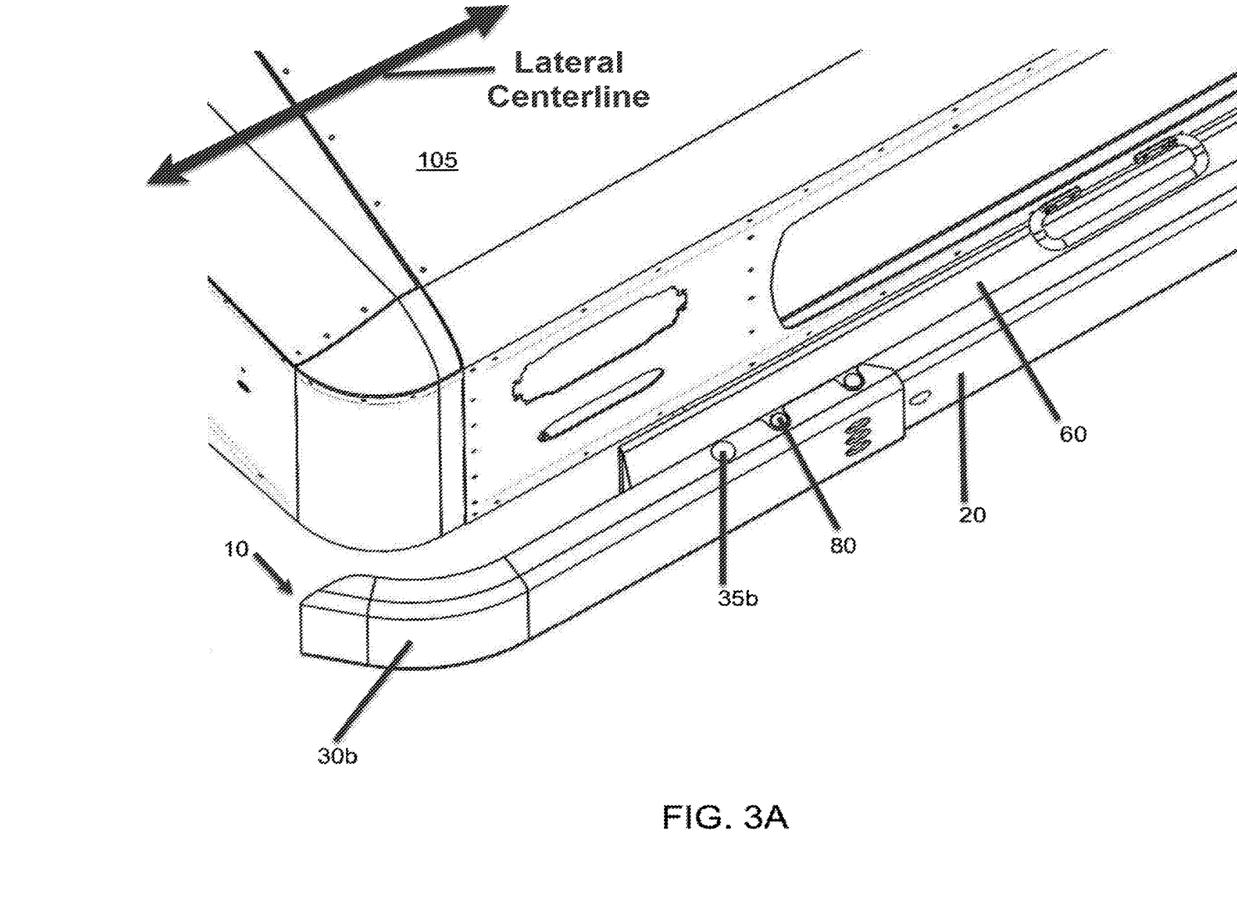
FIGS. 3A-3B are front perspective views of a vehicle having an exemplary bumper assembly as disclosed herein.
Figure 3B:
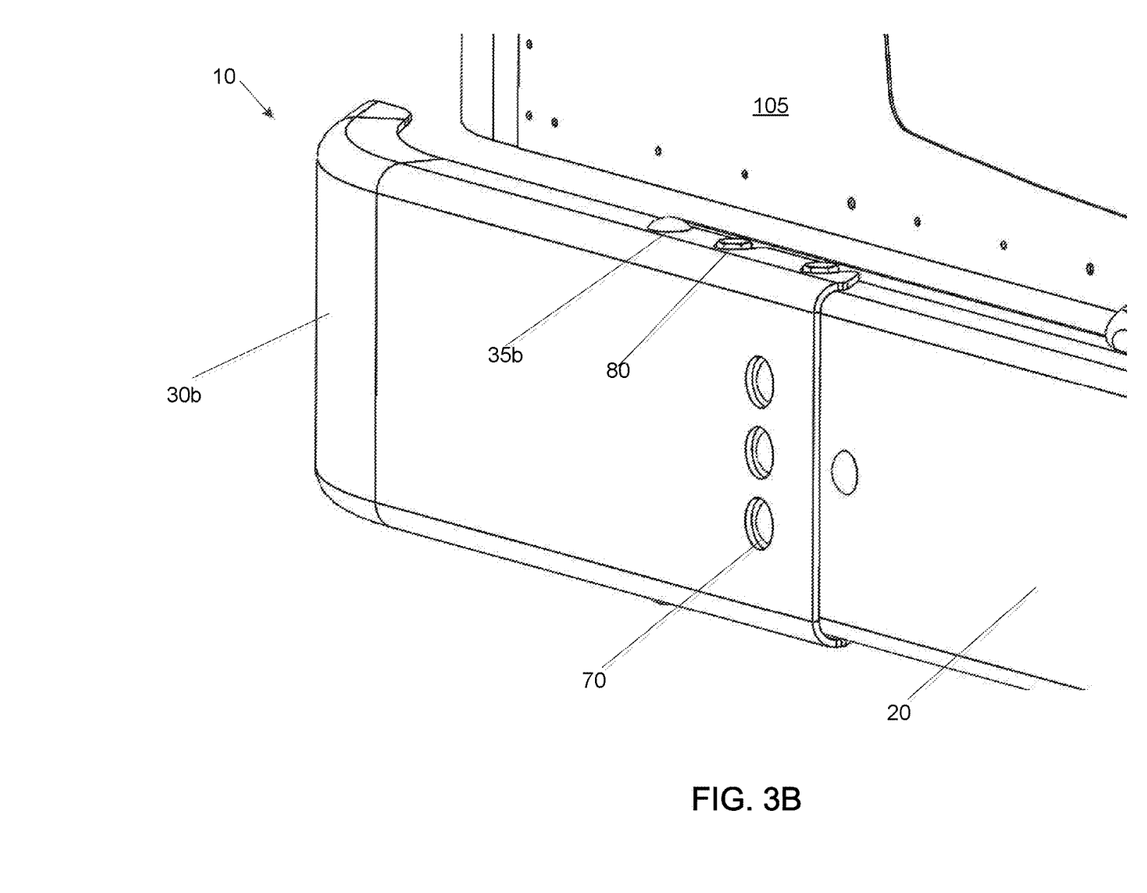

In exemplary aspects, the bumper assembly 10 can comprise at least one vertical fastener 80 (preferably, a plurality of vertical fasteners 80) that secures the transverse bumper body 20 to the at least one mounting bracket 60. In these aspects, the vertical fasteners (e.g., bolts) can be oriented parallel or substantially parallel to a vertical axis 14 that is perpendicular to the transverse axis 12. As further disclosed herein, it is contemplated that each wing extension 30a, 30b can be pivotally coupled to the bumper body 20 and/or the at least one mounting bracket 60 using a vertical fastener, such as a fulcrum or pin 82a, 82b. For example, it is contemplated that a top surface of each wing extension 30a, 30b can define openings that receive a corresponding fulcrum or pin 82a, 82b. Optionally, at least one vertical fastener 80 can be positioned proximate each end 22, 24 of the transverse bumper body 20. In exemplary optional aspects, it is contemplated that a row of vertical fasteners can be positioned proximate at least one end 22, 24 of the transverse bumper body 20, with the fasteners of the row being spaced apart relative to the transverse axis 12. Optionally, in these aspects, the fulcrums or pins 82a, 82b can optionally be positioned in alignment with vertical fasteners 80 (relative to transverse axis 12). As shown in FIGS. 2A-2B, it is further contemplated that a top surface of each wing extension 30a, 30b can, in addition to defining an opening that receives a corresponding fulcrum or pin 82a, 82b, also define a plurality of slots or cut-outs 37a, 37b that are complementary in shape to the exposed portions of vertical fasteners 80 positioned in alignment with a fulcrum or pin, thereby allowing the wing extensions 30a, 30b to return to rest positions in which the outer surfaces 34a, 34b of the wing extensions are flush or substantially flush with the outer surface of the bumper body 20. It is further contemplated that such exemplary configurations, which include wing extensions having increased transverse lengths, can help provide additional support to the bumper assembly 10 during a front or rear impact.

It is contemplated that the components of the disclosed bumper assembly 10 can comprise any conventional bumper materials, including, for example and without limitation, steel, aluminum, and composite materials as are known in the art. Optionally, in exemplary aspects, it is contemplated that the elastic plates 40a, 40b disclosed herein can comprise spring steel, fiberglass, one or more composite materials, flat plates heat-tempered to have spring steel characteristics, flat plates heat-tempered to have spring characteristics, or combinations thereof.

Thus, in operation, it is contemplated that the disclosed elastic bumper assemblies can provide a lower cost of ownership by reducing the occurrence of whole-bumper replacements as a result of low-speed impacts. It is further contemplated that the disclosed bumper assemblies can absorb low-speed oblique impacts and return to their resting state without the need for maintenance. It is further contemplated that the disclosed bumper assemblies can use hard stops following impact forces (Fi) to provide protection to the hood and other vehicle body structures.

In exemplary aspects, in response to a reverse hooked wing impact, it is contemplated that the wing extensions 30a, 30b can be damaged. However, rather than requiring replacement of the entire bumper assembly 10, it is contemplated that only the wing extensions 30a, 30b need be replaced; that is, the remaining components of the assembly will remain fully functional.

Exemplary Aspects

In various exemplary aspects, disclosed herein is a bumper assembly comprising: a transverse bumper body having opposed first and second side ends spaced apart relative to a transverse axis; and a first wing extension pivotally coupled to the bumper assembly and being configured for pivotal movement relative to the first side end of the transverse bumper body, wherein the first wing extension has inner and outer surfaces and is moveable from a rest position to an impact position in response to an impact force acting within a horizontal plane, wherein, in the rest position, the outer surface of the first wing extension is parallel or substantially parallel to the transverse axis, wherein, in the impact position, the outer surface of the first wing extension is positioned at an acute angle relative to the transverse axis within the horizontal plane, and wherein the first wing extension is configured to return to the rest position in response to removal of the impact force.

In another exemplary aspect, the bumper assembly further comprises a first elastic plate coupled to the transverse bumper body and extending laterally from the first side end of the transverse bumper body, wherein the first elastic plate is positioned to contact the inner surface of the first wing extension as the first wing extension moves from the rest position to the impact position, and wherein the first elastic plate is configured to apply a spring-back force to the first wing extension to return the first wing extension to the rest position.

In another exemplary aspect, the first elastic plate has a proximal portion that is rigidly secured to the transverse bumper body and a distal portion that is deformable relative to the transverse axis.

In another exemplary aspect, the bumper assembly further comprises a first stop element configured to restrict deformation of the first elastic plate beyond a first stop position.

In another exemplary aspect, the first stop position corresponds to a maximum pivotal movement of the first wing extension.

In another exemplary aspect, the first wing extension is pivotally coupled to the transverse bumper body.

In another exemplary aspect, the bumper assembly further comprises at least one mounting bracket secured to the transverse bumper body, wherein the at least one mounting bracket defines the first stop element.

In another exemplary aspect, the first wing extension is pivotally coupled to the at least one mounting bracket.

In another exemplary aspect, the at least one mounting bracket defines a first slot configured to receive a portion of the first elastic plate.

In another exemplary aspect, the at least one mounting bracket comprises a single mounting bracket.

In another exemplary aspect, the bumper assembly further comprises a second wing extension pivotally coupled to the bumper assembly and configured for pivotal movement relative to the second side end of the transverse bumper body, wherein the second wing extension has inner and outer surfaces and is moveable from a rest position to an impact position in response to an impact force acting within a horizontal plane, wherein, in the rest position, the outer surface of the second wing extension is parallel or substantially parallel to the transverse axis, wherein, in the impact position, the outer surface of the second wing extension is positioned at an acute angle relative to the transverse axis within the horizontal plane, and wherein the second wing extension is configured to return to the rest position in response to removal of the impact force.

In another exemplary aspect, the bumper assembly further comprises first and second elastic plates coupled to the transverse bumper body and extending laterally from the respective first and second side ends of the transverse bumper body, wherein the first and second elastic plates are positioned to contact the inner surfaces of the first and second wing extensions as the first and second wing extensions move from the rest position to the impact position, and wherein the first and second elastic plates are configured to apply respective spring-back forces to the first and second wing extensions to return the first and second wing extensions to the rest position.

In another exemplary aspect, the first and second elastic plates have proximal portions that are rigidly secured to the transverse bumper body and distal portions that are deformable relative to the transverse axis.

In another exemplary aspect, the bumper assembly further comprises first and second stop elements configured to restrict deformation of the first and second elastic plate beyond respective first and second stop positions.

In another exemplary aspect, the first stop position corresponds to a maximum pivotal movement of the first wing extension, and the second stop position corresponds to a maximum pivotal movement of the second wing extension.

In another exemplary aspect, the bumper assembly further comprises at least one mounting bracket secured to the transverse bumper body, wherein the at least one mounting bracket defines the first and second stop elements.

In another exemplary aspect, the at least one mounting bracket defines a first slot configured to receive a portion of the first elastic plate and a second slot configured to receive a portion of the second elastic plate.

In another exemplary aspect, the at least one mounting bracket comprises a single mounting bracket.

In another exemplary aspect, the first wing extension has a side surface extending between the inner and outer surfaces, wherein, within the horizontal plane, the side surface is positioned at an acute angle relative to the outer surface.

In another exemplary aspect, the first and second wing extensions have respective side surfaces extending between the inner and outer surfaces of the respective first and second wing extensions, wherein, within the horizontal plane, the side surfaces of the first and second wing extensions are positioned at acute angles relative to the outer surfaces of the respective first and second wing extensions.

In another exemplary aspect, the second wing extension is pivotally coupled to the transverse bumper body.

In another exemplary aspect, the second wing extension is pivotally coupled to the at least one mounting bracket.

In various exemplary aspects, disclosed herein is a bumper assembly comprising: a transverse bumper body having opposed first and second side ends spaced apart relative to a transverse axis; and first and second wing extensions pivotally coupled to the bumper assembly and configured for pivotal movement relative to the first and second side ends of the transverse bumper body, wherein the first and second wing extensions have inner and outer surfaces and are moveable from a rest position to an impact position in response to an impact force acting within a horizontal plane, wherein, in the rest position, the outer surfaces of the first and second wing extensions are parallel or substantially parallel to the transverse axis, wherein, in the impact position, the outer surfaces of the first and second wing extensions are positioned at an acute angle relative to the transverse axis within the horizontal plane, and wherein the first and second wing extensions are configured to return to the rest position in response to removal of the impact force.

In another exemplary aspect, the bumper assembly further comprises first and second elastic plates coupled to the transverse bumper body and extending laterally from the respective first and second side ends of the transverse bumper body, wherein the first and second elastic plates are positioned to contact the inner surfaces of the first and second wing extensions as the first and second wing extensions move from the rest position to the impact position, and wherein the first and second elastic plates are configured to apply respective spring-back forces to the first and second wing extensions to return the first and second wing extensions to the rest position.

In another exemplary aspect, the bumper assembly further comprises first and second stop elements configured to restrict deformation of the first and second elastic plate beyond respective first and second stop positions.

In another exemplary aspect, the bumper assembly further comprises at least one mounting bracket secured to the transverse bumper body, wherein the at least one mounting bracket defines the first and second stop elements.

In another exemplary aspect, the at least one mounting bracket defines a first slot configured to receive a portion of the first elastic plate and a second slot configured to receive a portion of the second elastic plate.

In another exemplary aspect, the at least one mounting bracket comprises a single mounting bracket.

In another exemplary aspect, the first and second wing extensions have respective side surfaces extending between the inner and outer surfaces of the respective first and second wing extensions, wherein, within the horizontal plane, the side surfaces of the first wing extension and second wing extensions are positioned at acute angles relative to the outer surfaces of the respective first and second wing extensions.

In another exemplary aspect, the bumper assembly further comprises first and second elastic plates coupled to the transverse bumper body and extending laterally from the respective first and second side ends of the transverse bumper body, wherein the first and second elastic plates are positioned to contact the inner surfaces of the first and second wing extensions as the first and second wing extensions move from the rest position to the impact position, and wherein the first and second elastic plates are configured to apply respective spring-back forces to the first and second wing extensions to return the first and second wing extensions to the rest position.

In various exemplary aspects, disclosed herein is a vehicle comprising: a vehicle body; and at least one bumper assembly coupled to the vehicle body, wherein each bumper assembly comprises: a transverse bumper body having opposed first and second side ends spaced apart relative to a transverse axis; and first and second wing extensions pivotally coupled to the bumper assembly and configured for pivotal movement relative to the first and second side ends of the transverse bumper body, wherein the first and second wing extensions have inner and outer surfaces and are moveable from a rest position to an impact position in response to an impact force acting within a horizontal plane, wherein, in the rest position, the outer surfaces of the first and second wing extensions are parallel or substantially parallel to the transverse axis, wherein, in the impact position, the outer surfaces of the first and second wing extensions are positioned at an acute angle relative to the transverse axis within the horizontal plane, and wherein the first and second wing extensions are configured to return to the rest position in response to removal of the impact force.

In another exemplary aspect, the at least one bumper assembly comprises a front bumper assembly and a rear bumper assembly.

In another exemplary aspect, each bumper assembly further comprises first and second stop elements configured to restrict deformation of the first and second elastic plate beyond respective first and second stop positions.

In another exemplary aspect, each bumper assembly further comprises at least one mounting bracket secured to the transverse bumper body, wherein the at least one mounting bracket defines the first and second stop elements.

In another exemplary aspect, the at least one mounting bracket of each bumper assembly defines a first slot configured to receive a portion of the first elastic plate and a second slot configured to receive a portion of the second elastic plate.

In another exemplary aspect, the at least one mounting bracket comprises a single mounting bracket.

In another exemplary aspect, the first and second wing extensions have respective side surfaces extending between the inner and outer surfaces of the respective first and second wing extensions, wherein, within the horizontal plane, the side surfaces of the first wing extension and second wing extensions are positioned at acute angles relative to the outer surfaces of the respective first and second wing extensions.

In various exemplary aspects, disclosed herein is bumper assembly comprising: a transverse bumper body having opposed first and second side ends spaced apart relative to a transverse axis; first and second wing extensions configured for pivotal movement relative to the first and second side ends of the transverse bumper body, wherein the first and second wing extensions have inner and outer surfaces and are moveable from a rest position to an impact position in response to an impact force acting within a horizontal plane; first and second elastic plates coupled to the transverse bumper body and extending laterally from the respective first and second side ends of the transverse bumper body, wherein the first and second elastic plates are positioned to contact the inner surfaces of the first and second wing extensions as the first and second wing extensions move from the rest position to the impact position; and a mounting bracket secured to the transverse bumper body, wherein the mounting bracket defines first and second stop elements that are configured to restrict deformation of the first and second elastic plates beyond respective first and second stop positions, wherein the first and second wing extensions are pivotally coupled to the mounting bracket, wherein, in the rest position, the outer surfaces of the first and second wing extensions are substantially parallel to the transverse axis, wherein, in the impact position, the outer surfaces of the first and second wing extensions are positioned at an acute angle relative to the transverse axis within the horizontal plane, and wherein, following removal of the impact force, the first and second elastic plates are configured to apply respective spring-back forces to the first and second wing extensions to return the first and second wing extensions to the rest position.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, certain changes and modifications may be practiced within the scope of the appended claims.

What is claimed is:

1. A bumper assembly for a vehicle, the bumper assembly comprising:
   a transverse bumper body having opposed first and second side ends spaced apart relative to a transverse axis;
   a first wing extension pivotally coupled to the bumper assembly and configured for pivotal movement relative to the first side end of the transverse bumper body, wherein the first wing extension has opposing inner and outer surfaces and is moveable from a rest position to an impact position in response to an impact force acting within a horizontal plane, the inner surface of the first wing extension facing a lateral centerline of the vehicle and the outer surface of the first wing extension facing away from the lateral centerline of the vehicle;

a first elastic plate extending laterally from the first side end of the transverse bumper body, wherein the first elastic plate has a proximal portion that is rigidly secured to the transverse bumper body and a distal portion that is deformable relative to the transverse axis;

at least one mounting bracket secured to the transverse bumper body, wherein the at least one mounting bracket defines a first stop element that is configured to restrict deformation of the first elastic plate beyond a first stop position, wherein the at least one mounting bracket further defines a first slot configured to receive a portion of the first elastic plate, wherein, in the rest position, the outer surface of the first wing extension is substantially parallel to the transverse axis and the first stop element is inwardly spaced from the inner surface of the first wing extension toward the vehicle, wherein, in the impact position, the outer surface of the first wing extension is positioned at an acute angle relative to the transverse axis within the horizontal plane, and wherein the first wing extension is configured to return to the rest position in response to removal of the impact force, wherein the first elastic plate is positioned to contact the inner surface of the first wing extension as the first wing extension moves from the rest position to the impact position, and wherein the first elastic plate is configured to apply a spring-back force to the first wing extension to return the first wing extension to the rest position.

2. The bumper assembly of claim 1, wherein the first wing extension is pivotally coupled to the transverse bumper body.

3. The bumper assembly of claim 1, wherein the first wing extension is pivotally coupled to the at least one mounting bracket.

4. The bumper assembly of claim 1, wherein the at least one mounting bracket comprises a single mounting bracket.

5. The bumper assembly of claim 1, further comprising:
a second wing extension pivotally coupled to the bumper assembly and configured for pivotal movement relative to the second side end of the transverse bumper body, wherein the second wing extension has inner and outer surfaces and is moveable from a rest position to an impact position in response to an impact force acting within the horizontal plane, the inner surface of the second wing extension facing the vehicle and the outer surface of the second wing extension facing away from the vehicle wherein, in the rest position, the outer surface of the second wing extension is substantially parallel to the transverse axis, wherein, in the impact position, the outer surface of the second wing extension is positioned at an acute angle relative to the transverse axis within the horizontal plane, and wherein the second wing extension is configured to return to the rest position in response to removal of the impact force.

6. The bumper assembly of claim 5, further comprising a second elastic plate coupled to the transverse bumper body and extending laterally from the second side end of the transverse bumper body, wherein the second elastic plate is positioned to contact the inner surface of the second wing extension as the second wing extension moves from the rest position to the impact position, and wherein the second elastic plate is configured to apply a spring-back force to the second wing extension to return the second wing extension to the rest position.

7. The bumper assembly of claim 6, wherein the second elastic plate has a proximal portion that is rigidly secured to the transverse bumper body and a distal portion that is deformable relative to the transverse axis.

8. The bumper assembly of claim 6, further comprising a second stop element configured to restrict deformation of the second elastic plate beyond a second stop position.

9. The bumper assembly of claim 8, wherein the at least one mounting bracket defines the second stop element.

10. The bumper assembly of claim 9, wherein the at least one mounting bracket defines a second slot configured to receive a portion of the second elastic plate.

11. The bumper assembly of claim 9, wherein the at least one mounting bracket comprises a single mounting bracket.

12. The bumper assembly of claim 5, wherein the second wing extension is pivotally coupled to the transverse bumper body.

13. The bumper assembly of claim 9, wherein the second wing extension is pivotally coupled to the at least one mounting bracket.

14. A bumper assembly for a vehicle, the bumper assembly comprising:
a transverse bumper body having opposed first and second side ends spaced apart relative to a transverse axis;

first and second wing extensions configured for pivotal movement relative to the first and second side ends of the transverse bumper body, wherein the first and second wing extensions have opposing inner and outer surfaces and are moveable from a rest position to an impact position in response to an impact force acting within a horizontal plane, the inner surfaces of the first and second wing extensions facing a lateral centerline of the vehicle and the outer surfaces of the first and second wing extensions facing away from the lateral centerline of the vehicle;

first and second elastic plates coupled to the transverse bumper body and extending laterally from the respective first and second side ends of the transverse bumper body, wherein the first and second elastic plates are positioned to contact the inner surfaces of the first and second wing extensions as the first and second wing extensions move from the rest position to the impact position, wherein the first and second elastic plates have respective proximal portions that are rigidly secured to the transverse bumper body and respective distal portions that are deformable relative to the transverse axis; and a mounting bracket secured to the transverse bumper body, wherein the mounting bracket defines first and second stop elements that are configured to restrict deformation of the first and second elastic plates beyond respective first and second stop positions, wherein the first and second wing extensions are pivotally coupled to the mounting bracket, wherein the at least one mounting bracket defines a first slot configured to receive a portion of the first elastic plate and a second slot configured to receive a portion of the second elastic plate, wherein, in the rest position, the outer surfaces of the first and second wing extensions are substantially parallel to the transverse axis and the first and second stop elements are inwardly spaced from the inner surfaces of the first and second wing extensions toward the vehicle, wherein, in the impact position, the outer surfaces of the first and second wing extensions are positioned at an acute angle relative to the transverse axis within the horizontal plane, and wherein, following removal of the impact force, the first and second elastic plates are configured to apply respective spring-back forces to the first and second wing extensions to return the first and second wing extensions to the rest position.

15. A vehicle comprising:

a vehicle body; and at least one bumper assembly coupled to the vehicle body, wherein each bumper assembly comprises:

a transverse bumper body having opposed first and second side ends spaced apart relative to a transverse axis; and first and second wing extensions pivotally coupled to the bumper assembly and configured for pivotal movement relative to the first and second side ends of the transverse bumper body, wherein the first and second wing extensions have opposing inner and outer surfaces and are moveable from a rest position to an impact position in response to an impact force acting within a horizontal plane, the inner surfaces of the first and second wing extensions facing a lateral centerline of the vehicle body and the outer surfaces of the first and second wing extensions facing away from the lateral centerline of the vehicle body;

a first elastic plate extending laterally from the first side end of the transverse bumper body, wherein the first elastic plate has a proximal portion that is rigidly secured to the transverse bumper body and a distal portion that is deformable relative to the transverse axis; and at least one mounting bracket secured to the transverse bumper body, wherein the at least one mounting bracket defines a first stop element that is configured to restrict deformation of the first elastic plate beyond a first stop position, wherein the at least one mounting bracket defines a first slot configured to receive a portion of the first elastic plate, wherein, in the rest position, the outer surfaces of the first and second wing extensions are substantially parallel to the transverse axis and the first and second stop elements are inwardly spaced from the inner surfaces of the first and second wing extensions toward the vehicle body, wherein, in the impact position, the outer surfaces of the first and second wing extensions are positioned at an acute angle relative to the transverse axis within the horizontal plane, and wherein the first and second wing extensions are configured to return to the rest position in response to removal of the impact force, wherein the first elastic plate is positioned to contact the inner surface of the first wing extension as the first wing extension moves from the rest position to the impact position, and wherein the first elastic plate is configured to apply a spring-back force to the first wing extension to return the first wing extension to the rest position.

* * * * *